(12) United States Patent
Kawabe et al.

(10) Patent No.: US 7,711,592 B2
(45) Date of Patent: May 4, 2010

(54) SYSTEM, METHOD, AND PROGRAM FOR MANAGING TRANSPORT INFORMATION

(75) Inventors: Yohei Kawabe, Yokohama (JP); Yoshiaki Ichikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 8 days.

(21) Appl. No.: 11/696,763

(22) Filed: Apr. 5, 2007

(65) Prior Publication Data
US 2008/0030377 A1 Feb. 7, 2008

(30) Foreign Application Priority Data
Jun. 12, 2006 (JP) .............................. 2006-162464
Dec. 1, 2006 (JP) .............................. 2006-325605

(51) Int. Cl.
G06F 9/44 (2006.01)
G06F 17/00 (2006.01)
G07F 19/00 (2006.01)
G06Q 10/00 (2006.01)

(52) U.S. Cl. ............................. 705/7; 705/30; 705/417; 705/1

(58) Field of Classification Search ................ 705/414, 705/400, 11, 13, 7, 30, 32, 28, 29, 418, 1, 705/8, 9, 417; 701/25; 340/988, 989, 992, 340/993, 994
See application file for complete search history.

(56) References Cited

U.S. PATENT DOCUMENTS 6,883,710 B2 * 4/2005 Chung .......................... 235/385

7,313,549 B2 * 12/2007 Hudson ....................... 705/404
7,376,571 B1 * 5/2008 Racine et al. .................. 705/1
2002/0123917 A1 9/2002 Wolfe
2004/0024644 A1 2/2004 Gui et al.

FOREIGN PATENT DOCUMENTS

JP 2004-013816 1/2004
WO WO 2006/053566 5/2006

OTHER PUBLICATIONS

Datalogic: "Datalogic Jet, The Professional PDA", Internet article, May 18, 2006.
Smart Devices Direct: "Infowave Waveon W718 GSM/GPRS, GPS enabled ruggedised PDA (Waveon 718)", Internet article, Jul. 11, 2005.

* cited by examiner

*Primary Examiner*—Igor Borissov
(74) *Attorney, Agent, or Firm*—Antonelli, Terry, Stout & Kraus, LLP.

(57) ABSTRACT

A system is configured by a movement record acquiring unit that acquires a cargo movement record through data communication with a communication apparatus included in a transportation means to store the cargo movement record into a cargo movement record database, a load amount identifying unit that identifies cargos having the overlapping periods between the loading time and unloading time and transported by the same transportation means among the cargos to store a load record into a load record database, an average load amount calculating unit that calculates an average value of the past load amount in the loading period as an average load amount, an energy consumption calculating unit that calculates the energy consumption of each cargo, and an output processing unit that outputs the energy consumption of each cargo to an output interface.

6 Claims, 7 Drawing Sheets

CALCULATION BASIC INFORMATION DB — 125

| TRANSPORT-VEHICLE ID | FUEL TYPE | FUEL CONSUMPTION | FUEL UNIT REQUIREMENT (CARBON DIOXIDE EQUIVALENT) | MOVEMENT DISTANCE RECORD |
|---|---|---|---|---|
| CAR 001 | GASOLINE | 0.2 L/km | 280 g/L | 2006/05/22/09:00~ 2006/05/22/10:55: 100 km |
| CAR 003 | LIGHT OIL | 0.1 L/km | 480 g/L | 2006/05/22/10:55~ 2006/05/22/20:05: 800 km |
| SHIP 007 | HEAVY OIL | 0.05 L/km | 580 g/L | 2006/05/22/20:05~ 2006/07/22/03:04: 2000 km |
| ⋮ | ⋮ | ⋮ | ... | ... |

FIG. 2

MOVEMENT RECORD DB — 126

| CARGO ID | TRANSPORT-VEHICLE ID | LOADING TIME TO UNLOADING TIME | LOADING POINT TO UNLOADING POINT | ... |
|---|---|---|---|---|
| 100 | CAR 001 | am 9:00~ am 10:55 | BASE A (TOKYO) TO BASE B (SHIZUOKA) | ... |
| 102 | CAR 001 | am 9:00~ am 10:55 | BASE A (TOKYO) TO BASE B (SHIZUOKA) | ... |
| 106 | CAR 001 | am 9:00~ pm 3:15 | BASE A (TOKYO) TO BASE C (OSAKA) | ... |

LOAD RECORD DB ~127

| TRANSPORT-VEHICLE ID | TRANSPORT TIME-ZONE | PAST LOAD AMOUNT | LOADING RATE | ... |
|---|---|---|---|---|
| CAR001 | am 9:00~ am 10:55 | 687 kg | 50% | ... |
|  | am 10:55~ pm 3:15 | 125 kg | 9.1% | ... |
| CAR003 | am 9:00~ am 10:55 | 215 kg | 21.5% | ... |
|  | am 10:55~ pm 3:15 | 1000 kg | 100% | ... |
| ⋮ | ⋮ | ⋮ | ⋮ | ⋮ |

CARGO INFORMATION TABLE DB ~128

| SHIPPER ID | CARGO ID | CARGO WEIGHT (kg) |
|---|---|---|
| ABC | 100 | 50 |
| CDE | 102 | 512 |
| EFG | 106 | 125 |
| ⋮ | ⋮ | ⋮ |

SYSTEM, METHOD, AND PROGRAM FOR MANAGING TRANSPORT INFORMATION

BACKGROUND OF THE INVENTION

1. Field of the Invention

The present invention relates generally to a management technology for information of cargo transportation, and more particularly, to a transport information managing system, a transport information managing method, and a transport information managing program.

2. Description of the Related Art

A system estimating environmental burden such as transportation energy has conventionally been proposed. For example, with regard to a problem of providing an environmental burden evaluating method, device, and program for evaluating the environmental burden of each of a plurality of different routes by which a transaction object reaches a user, using at least one among a transportation means, a transfer means for persons, and a communication means as means constituting the route by which the transaction object reaches the user, in an proposed environmental burden evaluating method has been proposed for evaluating the environmental burden of each of a plurality of different routes by which a transaction object reaches a user, using at least one among a transportation means, a transfer means for persons, and a communication means, a storage means stores a first environmental burden unit requirement precalculated for each different type of the transportation means, a second environmental burden unit requirement precalculated for each different type of the transfer means, and a third environmental burden unit requirement precalculated for each different type of the communication means; for each of the plurality of routes, the means used in the route and the environmental burden unit requirement corresponding to the type are read from the storage means; and the environmental burden is evaluated for each of the plurality of routes by calculating the environmental burden corresponding to the means used in the route, the type, and the usage amount among a first environmental burden corresponding to the usage amount of the transportation means based on the first environmental burden unit requirement corresponding to the type of the transportation means, a second environmental burden corresponding to the usage amount of the transfer means based on the second environmental burden unit requirement corresponding to the type of the transfer means, and a third environmental burden corresponding to the usage amount of the communication means based on the third environmental burden unit requirement corresponding to the type of the communication means (Japanese Patent Application Laid-Open Publication No. 2004-13826).

By the way, a law will be enforced for amending a portion of the law related to the rationalization of energy usage ("Revised Law concerning the Rational Use of Energy"). In the enforcement of Revised Law concerning the Rational Use of Energy, a shipper is required to develop an energy saving plan and to report an energy usage amount. Therefore, a carrier consigned by shippers is required to calculate an energy usage amount expended in cargo transportation for each shipper and to report the obtained information to the shippers. That is, a technology is desired for calculating the transport distance and total transport energy amount of cargos of the same shipper for a certain period to create a report file.

SUMMARY OF THE INVENTION

The present invention was conceived in view of the above problem and it is therefore the main object of the present invention to provide a transport information managing system, a transport information managing method, and a transport information managing program that enables a process of efficiently and certainly calculating and outputting a transport energy usage amount for each cargo or each shipper.

In order to achieve the above object, according to a first aspect of the present invention there is provided a transport information managing system performing information management associated with cargo transportation, comprising a movement record acquiring unit that acquires ID of a transportation means that transports a cargo, information of place and time of loading and unloading of the cargo to and from the transportation means, i.e., a loading point, an unloading point, a loading time, and an unloading time, and a load amount of the cargo, along with information of a cargo ID of the cargo, as a cargo movement record through data communication with a communication apparatus included in the transportation means to store the acquired cargo movement record into a cargo movement record database for each cargo ID; a load amount identifying unit that reads the information of the cargo ID, load amount, transportation means ID, loading time, and unloading time of each cargo included in each cargo movement record from the cargo movement record database to identify cargos having the overlapping periods between the loading time and unloading time and transported by the same transportation means among the cargos, the load amount identifying unit aggregating the load amounts of the identified cargos to calculate a load amount loaded at each clock time by each transportation means as a past load amount, the load amount identifying unit storing the information of the transportation means, time, and past load amount into a load record database as a load record; an average load amount calculating unit that reads the information of the transportation means, loading time, and unloading time of cargos included in the cargo movement record from the cargo movement record database, the average load amount calculating unit reading the past load amount of the transportation means in a loading period between the read loading time and unloading time from the load record database, the average load amount calculating unit calculating an average value of the past load amount in the loading period as an average load amount, which is stored into the memory; an energy consumption calculating unit that divides the load amount of the cargo in the cargo movement record database by the average load amount in the memory, the energy consumption calculating unit multiplying the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the memory; and an output processing unit that reads and outputs the energy consumption of each cargo from the memory to an output interface.

The transport information managing system may preferably comprise a report submitting unit that fills corresponding fields of a form data for reporting to the shipper read from an appropriate storage apparatus with the information of the energy consumption of each cargo from the memory and the information of the movement distance record of the transportation means in the time zone read from the calculation basic information database, to create a report to the shipper and output it to the output interface.

The transport information managing system may preferably comprise a cargo information table acquiring unit that acquires a cargo information table including information of at least a shipper ID, a cargo ID and a cargo weight for each cargo through data communication with a communicating apparatus included in the transportation means or by reading the corresponding data from the cargo movement record database to store the acquired cargo information table of each cargo into a cargo information table database, and a ton-km value calculating unit that reads the information of the loading point and unloading point of the cargo from the cargo movement record database, the ton-km value calculating unit acquiring from the calculation basic information database the information of the movement distance history of the cargo having a movement interval between the read loading and unloading points, the ton-km value calculating unit multiplying the movement distance record by the cargo weight of the cargo read from the cargo information table database, the ton-km value calculating unit aggregating the multiplied values for each shipper ID to calculate and store a ton-km value into a memory, wherein the output processing unit outputs the ton-km value read from the memory to the output interface.

The transport information managing system may preferably comprise a report submitting unit that fills the corresponding fields of the form data for reporting to the shipper read from the appropriate storage apparatus with the information of the ton-km value of each shipper ID in the memory, to create a report to the shipper and output it to the output interface.

In order to achieve the above object, according to a second aspect of the present invention there is provided a transport information managing method effected by a computer performing information management associated with cargo transportation, the method comprising the processes of acquiring ID of a transportation means that transports a cargo, information of place and time of loading and unloading of the cargo to and from the transportation means, i.e., a loading point, an unloading point, a loading time, and an unloading time, and a load amount of the cargo, along with information of a cargo ID of the cargo, as a cargo movement record through data communication with a communication apparatus included in the transportation means to store the acquired cargo movement record into a cargo movement record database for each cargo ID; reading the information of the cargo ID, load amount, transportation means ID, loading time, and unloading time of each cargo included in each cargo movement record from the cargo movement record database to identify cargos having the overlapping periods between the loading time and unloading time and transported by the same transportation means among the cargos, aggregating the load amounts of the identified cargos to calculate a load amount loaded at each clock time by each transportation means as a past load amount, and storing the information of the transportation means, time, and past load amount into a load record database as a load record; reading the information of the transportation means, loading time, and unloading time of cargos included in the cargo movement record from the cargo movement record database, reading the past load amount of the transportation means in a loading period between the read loading time and unloading time from the load record database, and calculating an average value of the past load amount in the loading period as an average load amount, which is stored into the memory; dividing the load amount of the cargo in the cargo movement record database by the average load amount in the memory, multiplying the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the memory; and reading and outputting the energy consumption of each cargo from the memory to an output interface.

In order to achieve the above object, according to a third aspect of the present invention there is provided a transport information managing program operable to drive a computer performing information management associated with cargo transportation to execute the steps of acquiring ID of a transportation means that transports a cargo, and information of place and time of loading and unloading of the cargo to and from the transportation means, i.e., a loading point, an unloading point, a loading time, and an unloading time, and a load amount of the cargo, along with information of a cargo ID of the cargo, as a cargo movement record through data communication with a communication apparatus included in the transportation means to store the acquired cargo movement record into a cargo movement record database for each cargo ID; reading the information of the cargo ID, load amount, transportation means ID, loading time, and unloading time of each cargo included in each cargo movement record from the cargo movement record database to identify cargos having the overlapping periods between the loading time and unloading time and transported by the same transportation means among the cargos, aggregating the load amounts of the identified cargos to calculate a load amount loaded at each clock time by each transportation means as a past load amount, and storing the information of the transportation means, time, and past load amount into a load record database as a load record; reading the information of the transportation means, loading time, and unloading time of cargos included in the cargo movement record from the cargo movement record database, reading the past load amount of the transportation means in a loading period between the read loading time and unloading time from the load record database, and calculating an average value of the past load amount in the loading period as an average load amount, which is stored into the memory; dividing the load amount of the cargo in the cargo movement record database by the average load amount in the memory, multiplying the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the memory; and reading and outputting the energy consumption of each cargo from the memory to an output interface.

Other problems and solutions disclosed in this application will become apparent from the description of the preferred embodiments of the present invention and the drawings.

The present invention enables a process of efficiently and certainly calculating and outputting a transport energy usage amount for each cargo or each shipper.

BRIEF DESCRIPTION OF THE DRAWINGS

FIG. 2 depicts a data structure example 1 of a database according to the embodiment;

FIG. 3 depicts a data structure example 2 of the database according to the embodiment;

FIGS. 4A and 4B depict a data structure example 3 of the database according to the embodiment;

DESCRIPTION OF THE PREFERRED EMBODIMENTS

—System Configuration—

Figure 1:
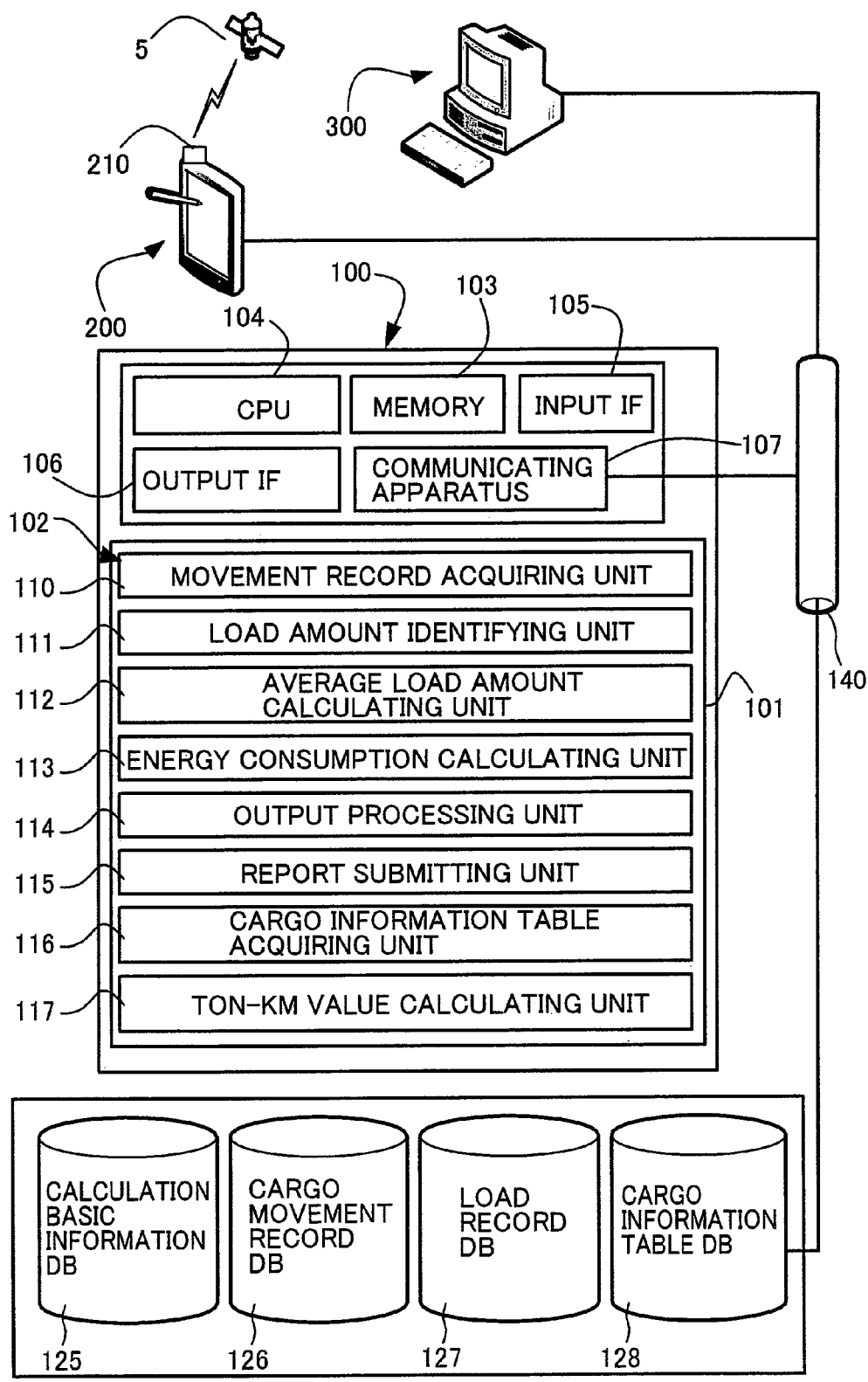
FIG. 1 is a network configuration diagram including a transport information managing system of the embodiment.

An embodiment of the present invention will hereinafter be described in detail with reference to the drawings. FIG. 1 is a network configuration diagram including a transport information managing system 100 of the embodiment. The transport information managing system 100 (hereinafter, system 100) is a system that manages information associated with cargo transportation. A functional configuration of the system 100 includes a program 102 in a program database 101 such as a rewritable memory, and the program 102 is read onto a memory 103 and executed by a CPU 104 that is a calculating apparatus, so that a function executing the transport information managing method of the present invention should be achieved. The system 100 also includes an input interface 105 such as various buttons, an output interface 106 such as a display, a communicating apparatus 200 disposed in various transportation means including vehicles such as trucks and cargo ships, and a communicating apparatus 107 that is responsible for giving/receiving data to/from an external apparatus such as a shipper terminal 300 of a shipper. The system 100 connects through the communication apparatus 107 to external apparatuses such as the communication apparatus 200 and the shipper terminal 300 and, for example, various networks 140 such as a public line network, the internet, and wireless LAN to give/receive data. An I/O unit 108 performs data buffering and various intermediation processes between various function units and the communication apparatus 107.

Description will be made of function units configured/ retained by the system 100 based on the program 102, for example. The system 100 can utilize a calculation basic information database 125 that stores fuel-consumption information of a transportation means of cargo, unit requirement information of the fuel used by the transportation means, and information of a movement distance record of the transportation means, a cargo movement record database 126 that stores a cargo movement record for each cargo ID, and a load record database 127 that stores a load record correlating the transportation means, a time, and a past load amount. The databases 125 to 127 can be included in an appropriate storage apparatus such as a hard disk drive disposed in a computer apparatus of the system 100. Alternatively, the databases 125 to 127 may exist on the network 140 separately from the system 100. In this case, the system 100 includes, for example, DBMS (Database Management System), and accesses to the databases 125 to 127 through the network 140 to perform processes such as information registration and information retrieval.

The system 100 includes a movement record acquiring unit 110 that acquires ID of a transportation means transporting a cargo, information of place and time of loading and unloading of the cargo to and from the transportation means, i.e., a loading point, an unloading point, a loading time, and an unloading time, and a load amount of the cargo, along with information of a cargo ID of the cargo, as a cargo movement record 130 through data communication with the communication apparatus included in the transportation means to store the acquired cargo movement record 130 into the cargo movement record database 126 for each cargo ID.

The system 100 includes a load amount identifying unit 111 that reads the information of the cargo ID, load amount, transportation means ID, loading time, and unloading time of each cargo included in each cargo movement record from the cargo movement record database 126 to identify cargos having the overlapping periods between the loading time and unloading time and transported by the same transportation means among the cargos, that aggregates the load amounts of the identified cargos to calculate a load amount loaded at each clock time by each transportation means as a past load amount, and that stores the information of the transportation means, time, and past load amount into the load record database 127 as a load record 135.

The system 100 includes an average load amount calculating unit 112 that reads the information of the transportation means, loading time, and unloading time of cargos included in the cargo movement record from the cargo movement record database 126, that reads the past load amount of the transportation means in a loading period between the read loading time and unloading time from the load record database 127, and that calculates an average value of the past load amount in the loading period as an average load amount, which is stored into the memory 103.

The system 100 includes an energy consumption calculating unit 113 that divides the load amount of the cargo in the cargo movement record database 126 by the average load amount in the memory 103, and that multiplies the divided value by the movement distance record, fuel consumption, and fuel unit requirement of the transportation means in the time zone read from the calculation basic information database 125 storing the fuel-consumption information of the transportation means of the cargo, the unit requirement information of the fuel used by the transportation means, and information of the movement distance record of the transportation means to calculate and store the energy consumption of each cargo into the memory 103.

The system 100 includes an output processing unit 114 that reads and outputs the energy consumption of each cargo from the memory 103 to the output interface 106.

The system 100 preferably includes a report submitting unit 115 that preliminarily stores into an appropriate storage apparatus (e.g., the memory 103) the information of the energy consumption of each cargo from the memory 103 and the information of the movement distance record of the transportation means in the time zone read from the calculation basic information database 125, and that fills the corresponding fields of shipper report form data 138 read from this storage apparatus (e.g., fields correlated with flags for filling the fields with the information of the energy consumption and the movement distance record in the form data) with the information to create and output a shipper report 139 to the output interface 106 or the shipper terminal 300.

The system 100 preferably includes a cargo information table acquiring unit 116 that acquires a cargo information table 150 including information of at least a cargo ID and a cargo weight for each cargo through data communication with the communicating apparatus included in the transportation means or by reading the corresponding data from the cargo movement record database 126 to store the acquired cargo information table 150 of each cargo into a cargo information table database 128.

The system 100 preferably includes a ton-km value calculating unit 117 that reads the information of the loading point and unloading point of the cargo from the cargo movement record database 126, that acquires from the calculation basic information database 125 the information of the movement distance record of the cargo having a movement interval between the read loading and unloading points, that multiplies the movement distance record by the cargo weight of the cargo read from the cargo information table database 128, and that aggregates the multiplied values for each shipper ID to calculate and store a ton-km value into a memory.

In this case, the output processing unit 114 outputs to the output interface the ton-km value of each shipper ID read from the memory 103. The report submitting unit 115 fills the corresponding fields of the shipper report form data 138 read from the appropriate storage apparatus with the information of the ton-km value of each shipper ID read from the memory 103 to create the shipper report 139, which is output to the output interface 106.

The ton-km value is a unit representing a cargo transport amount and is acquired by multiplying a tonnage of a cargo weight by kilometers of the transport distance.

The function units 110 to 117 may be implemented by hardware or may be implemented by a program stored in an appropriate storage apparatus such as a memory or HDD (Hard Disk Drive). In this case, in accordance with the program execution, the CPU of the system 100 reads the program from the storage apparatus onto the memory to execute the program.

—Database Configuration—

Description will be made of data structures of the calculation basic information database 125, the cargo movement record database 126, the load record database 127, and the cargo information table database 128 utilized by the system 100 of the embodiment.

FIG. 2 depicts a data structure example 1 of the database according to the embodiment. As shown in FIG. 2, the calculation basic information database 125 is a database that stores the fuel-consumption information of the transportation means of cargo, the unit requirement information of the fuel used by the transportation means, and information of the movement distance record of the transportation means and is an aggregation of records using, for example, a transport-vehicle ID (ID of the transportation means) as a key to correlate information such as a fuel type, such as gasoline, heavy oil, light oil, alcohol, and gas, fuel consumption, fuel unit requirement ($CO_2$ generation amount, crude oil equivalent amount), the movement distance record (e.g., a movement distance calculated based on transitions in information of distance between transportation bases of the transportation means and position information of the transportation means (derived from a GPS apparatus)). The calculation basic information database 125 may be configured by three databases which are a database that stores the fuel consumption information of the transportation means, a database that stores the unit requirement information of the fuel used by the transportation means, and a database that stores the movement distance record of the transportation means.

FIG. 3 depicts a data structure example 2 of the database according to the embodiment. As shown in FIG. 3, the cargo movement record database 126 stores the cargo movement record 130 for each cargo ID and is an aggregation of records, i.e., the cargo movement records 130, using, for example, the cargo ID as a key to correlate information of the transport-vehicle ID, the loading time, the loading point, the unloading time, and the unloading point. The data of the cargo movement record 130 are data transmitted to the system 100 through the network 140 from the communicating apparatus included in the transportation means (such as a vehicle or ship) transporting the cargo. It can be assumed that, for example, a person in charge, etc., input the information of the cargo ID, the loading time, the loading point, the unloading time, and the unloading point through a handy terminal, etc., on the transportation means. Therefore, it may be considered that the handy terminal transmits the data of the cargo movement record through the communicating apparatus to the system 100 (of course, it can also be assumed that the data of the cargo movement record are automatically input by the computer of the transportation means in cooperation with a position detecting sensor of the cargo or transportation means and a clock function of the computer).

FIGS. 4A and 4B depict a data structure example 3 of the database according to the embodiment. As shown in FIG. 4A, the load record database 127 stores the load record 135 correlating the transportation means, a time (time zone), and the past load amount, and is an aggregation of records, i.e., the load records 135, using, for example, the transport-vehicle ID (ID of the transportation means) as a key to correlate information such as the time zone, the past load amount, and a loading rate (a rate of the past load amount relative to the maximum load amount of the transportation means).

As shown in FIG. 4B, the cargo information table database 128 stores the cargo information table 150, and is an aggregation of records, i.e., the cargo information tables 150, using, for example, the shipper ID as a key to correlate information such as the cargo ID and the cargo weight (kg).

Process Flow Example

Figure 5:
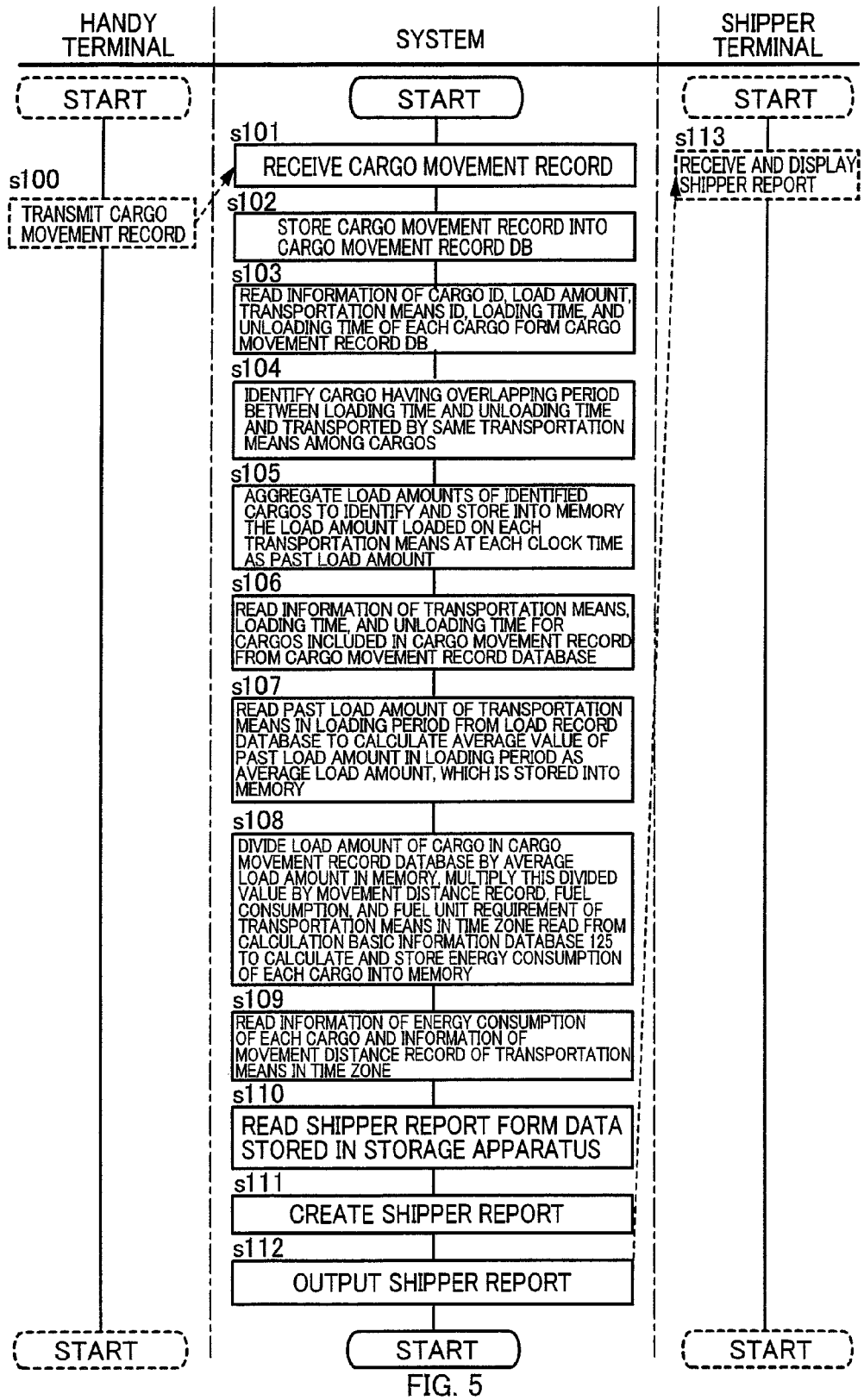
FIG. 5 depicts a process flow example 1 corresponding to a transport information managing method according to the embodiment.

A process flow example corresponding to a transport information managing method of the embodiment will hereinafter be described. Various operations corresponding to the described transport information managing method are implemented by a program read onto an appropriate memory and executed by the system 100. Such a program is configured by codes for performing various operations described below. FIG. 5 depicts a process flow example 1 corresponding to a transport information managing method according to the embodiment.

Although the transportation means of the embodiment is assumed to be a vehicle such as a truck and a ship such as a cargo ship as an example, this is not a limitation and the transportation means may be assumed to be various other transportation means.

A transporting route of a cargo is assumed to be the following flow as an example. A cargo transported on request from a shipper is received, for example, at a base A (Tokyo) of a transport company from the shipper. The cargo is transported from the base A to a base B (Shizuoka) by a first transportation means that is an A-track. The cargo is transported from the base B to a base C (Osaka) by a next transportation means that is a B-track. The cargo is transported from the base C to a base D (San Francisco) by the last transportation means that is a cargo ship. Each transportation means, i.e., the A-track, the B-track, and the cargo ship concurrently transport a plurality of cargos through the above route.

A predetermined person in charge such as a driver of the transportation means carries an information processing apparatus such as a handy terminal as the communicating apparatus 200. This handy terminal is an apparatus that performs reading operation associated with loading and unloading of the cargo for an IC tag (storing in a storage area of a storage apparatus the preset cargo ID, the weight used as the load amount, etc.) and a barcode (encoding the preset cargo ID, the weight used as the load amount, etc.) attached to the cargo. The handy terminal includes a CPU, a memory, an input interface such as buttons and a touch panel, an output interface such as a display, and a reader apparatus for the IC tag and barcode.

The handy terminal includes not only a communication function that enables a data communication with the system 100 but also a clock function commonly included in a computer apparatus and can retain and utilize date/time information. Therefore, when the cargo is loaded or unloaded, the handy terminal can obtain the date/time information from the clock function while reading the information of the cargo ID and load amount from the barcode, and can obtain the date/time information of the loading and unloading of the cargo, the cargo ID, and the load amount at the same time. If the handy terminal includes, for example, a GPS apparatus, the handy terminal can acquire the position information (latitudinal/longitudinal data calculated by the GPS apparatus with data from a GPS satellite) of the cargo and transportation means from the GPS apparatus along with the cargo ID, the load amount, the loading and unloading date/time information when the cargo is loaded or unloaded.

The handy terminal acquires the cargo ID, the load amount, the loading and unloading date/time information, and the position information, and transmits the above information and an ID of the transportation means (stored in the memory of the handy terminal in advance) through the network 140 to the system 100 as the data of the cargo movement record 130 (s100). The data transmission may be performed at the timing of loading or unloading the cargo or may be performed at the suitable timing after the loading or unloading. In either case, the data of the cargo movement record to the system 100 are generated and transmitted by the handy terminal acting as the communication apparatus 200 of the transportation means every time the cargo is loaded or unloaded.

Various pieces of information transmitted by the handy terminal to the system 100 are received by the communicating apparatus 107 of the system 100 establishing the data communication with the handy terminal through the network 140. The communicating apparatus 107 of the system 100 delivers the received data to the movement record acquiring unit 110. The movement record acquiring unit 110 receives and acquires the data of the cargo movement record 130, which are the transportation means IDs (e.g., CAR001, CAR003, and SHIP007) and the information of time and place of the loading and unloading of the cargo, i.e., the loading points (e.g., Tokyo, Shizuoka, Osaka, San Francisco), the unloading points, the loading times, and the unloading times transmitted as above from the handy terminal acting as the communicating apparatus 200, along with information of the cargo IDs (e.g., 100, 102, and 106) (s101). The acquired cargo movement record 130 is stored in the cargo movement record database 126 for each cargo ID by the movement record acquiring unit 110 (s102).

The load amount identifying unit 111 of the system 100 reads the information of the cargo ID, load amount, transportation means ID, loading time, and unloading time of each cargo included in the cargo movement record 130 from the cargo movement record database 126 onto the memory 103 (s103). It is assumed that the information of three cargo IDs "100", "102", and "106" is read out in this process, for example, which is each loading amount "50 kg", "512 kg", and "125 kg", the transportation means of each cargo "CAR001", "CAR001", and "CAR001", the loading time of each cargo "am 9:00", "am 9:00", and "am 11:45", and each unloading time "am 10:55", "am 10:55", and "pm 3:15".

The load amount identifying unit 111 identifies a cargo having an overlapping period between the loading time and unloading time and transported by the same transportation means among the cargos (s104). In the above example, since all the cargo IDs "100", "102", and "106", which are stored in the memory 103, are correlated with the transportation means "CAR001", the load amount identifying unit 111 can recognize from this correlation that all the three cargos are transported by the same transportation means. Similarly, for the three cargos, the overlapping period between the loading time and unloading time is "am 9:00" to "am 10:55" (see FIG. 6). Although two cargos with the cargo IDs "100" and "102" have the same loading/unloading times, the cargo with the cargo ID "106" has the loading time same as the two cargos "100" and "102" and the different unloading time since the cargo is further transported.

After identifying the overlapping period between the loading time and the unloading time of the cargos, the load amount identifying unit 111 aggregates the load amounts of the identified cargos for each overlapping period and to identify and store into the memory 103 the load amount loaded on each transportation means at each clock time as the past load amount (s105). In the above example, the load amount identifying unit 111 aggregates the values of the load amounts "50 kg", "512 kg", and "125 kg" to obtain a value of "687 kg". The load amount identifying unit 111 stores into the memory 103 the information indicating that a total of "687 kg" of cargos was transported by the transportation means "CAR001" in the time zone "am 9:00 to am 10:55". The load amount identifying unit 111 performs such a process for each transportation means and each time zone.

The average load amount calculating unit 112 of the system 100 reads the information of the transportation means, loading time, and unloading time for cargos included in the cargo movement record 130 from the cargo movement record database 126 (s106). The average load amount calculating unit 112 reads the past load amount of the transportation means in a loading period between the read loading time and unloading time from the load record database 127 and calculates an average value of the past load amount in the loading period as an average load amount, which is stored into the memory 103 (s107).

Figure 6:
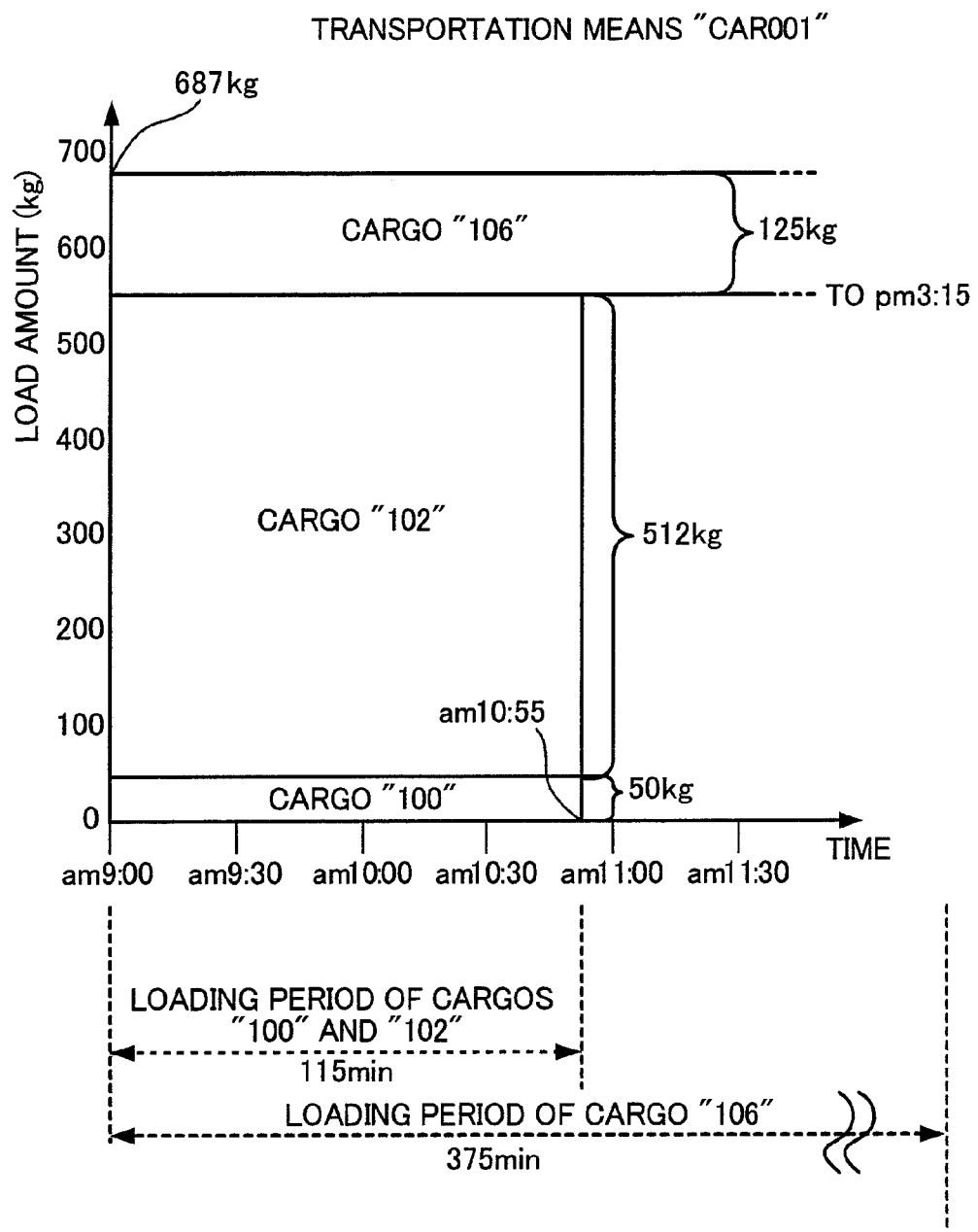
FIG. 6 depicts a transportation status example for each transportation means in the same time zone according to the embodiment.

In the example shown in FIG. 6, the cargo "106" was transported by the transportation means "CAR001" from "am 9:00 to pm 3:15". In the loading period of "am 9:00 to pm 3:15", other cargos "100" and "102" were also loaded on the same transportation means "CAR001" in a time zone "am 9:00 to am 10:55". Therefore, to obtain an average load amount of the transportation means "CAR001" in the loading period of "am 9:00 to pm 3:15", for example, "((load amount of the cargo "100"))+(load amount of the cargo "102"))× (time length of "am 9:00 to am 10:55")+(load amount of the cargo "106")×(time length of "am 9:00 to pm 3:15")="X" may be defined, and the "X" may be divided by "(time length of am 9:00 to pm 3:15)". When substituted by the actual numeric value, the X is (50+512) kg×115 min+125 kg×375 min=111505 kg·min. The average load amount is X/(time length of am 9:00 to pm 3:15)=111505/375=297 kg.

The energy consumption calculating unit 114 of the system 100 divides the load amount of the cargo in the cargo movement record database 126 by the average load amount in the memory 103, and multiplies the divided value by the movement distance record, fuel consumption, and fuel unit requirement of the transportation means in the time zone read from the calculation basic information database 125 to calculate and store the energy consumption of each cargo into the memory 103 (s108).

For example, when a process target is the cargo ID "100" of the above example, the load amount of the cargo is "50 kg"; the transportation means transporting the cargo is "CAR001"; and the transport time zone is "am 9:00 to am 10:55". The average load amount of this time zone is "687 kg", which is obtained by simply aggregating the load amounts of the cargos "100", "102", and "106". It is assumed that the fuel consumption of the transportation means "CAR001" is "0.2 L/m", that the unit requirement of the fuel used ($CO_2$ amount) is "280 g/L", and that the movement distance of the transportation means "CAR001" in the time zone "am 9:00 to am 10:55" is "100 km" in accordance with the calculation basic information database 125. In this case, the energy consumption (carbon-dioxide emission equivalent) is "(50 kg/687 kg)×100 km×0.2 L/km×2 kg/L"=f"2.9 kg".

When a process target is the cargo ID "106" of the above example, the load amount of the cargo is "125 kg"; the transportation means transporting the cargo is "CAR001"; and the transport time zone is "am 9:00 to pm 3:15". The average load amount of this time zone is "297 kg" as calculated above. It is assumed that the fuel consumption of the transportation means "CAR001" is "0.2 L/m", that the unit requirement of the fuel used ($CO_2$ amount) is "280 g/L", and that the movement distance of the transportation means "CAR001" in the time zone "am 9:00 to pm 3:15" is "950 km" in accordance with the calculation basic information database 125. In this case, the energy consumption (carbon-dioxide emission equivalent) is "(125 kg/297 kg)×950 km×0.2 L/km×2 kg/L"="160 kg".

The calculated energy consumption data can be read from the memory 103 and output to the output interface 106 such as a display apparatus by the output processing unit 114 of the system 100.

Alternatively, the report submitting unit 115 of the system 100 reads and uses the data of the energy consumption from the memory 103 when creating a report for a shipper. The report submitting unit 115 reads the information of energy consumption of each cargo in the memory 103 and the information of movement distance record of the transportation means in the time zone read from the calculation basic information database 125 (s109).

Figure 7:
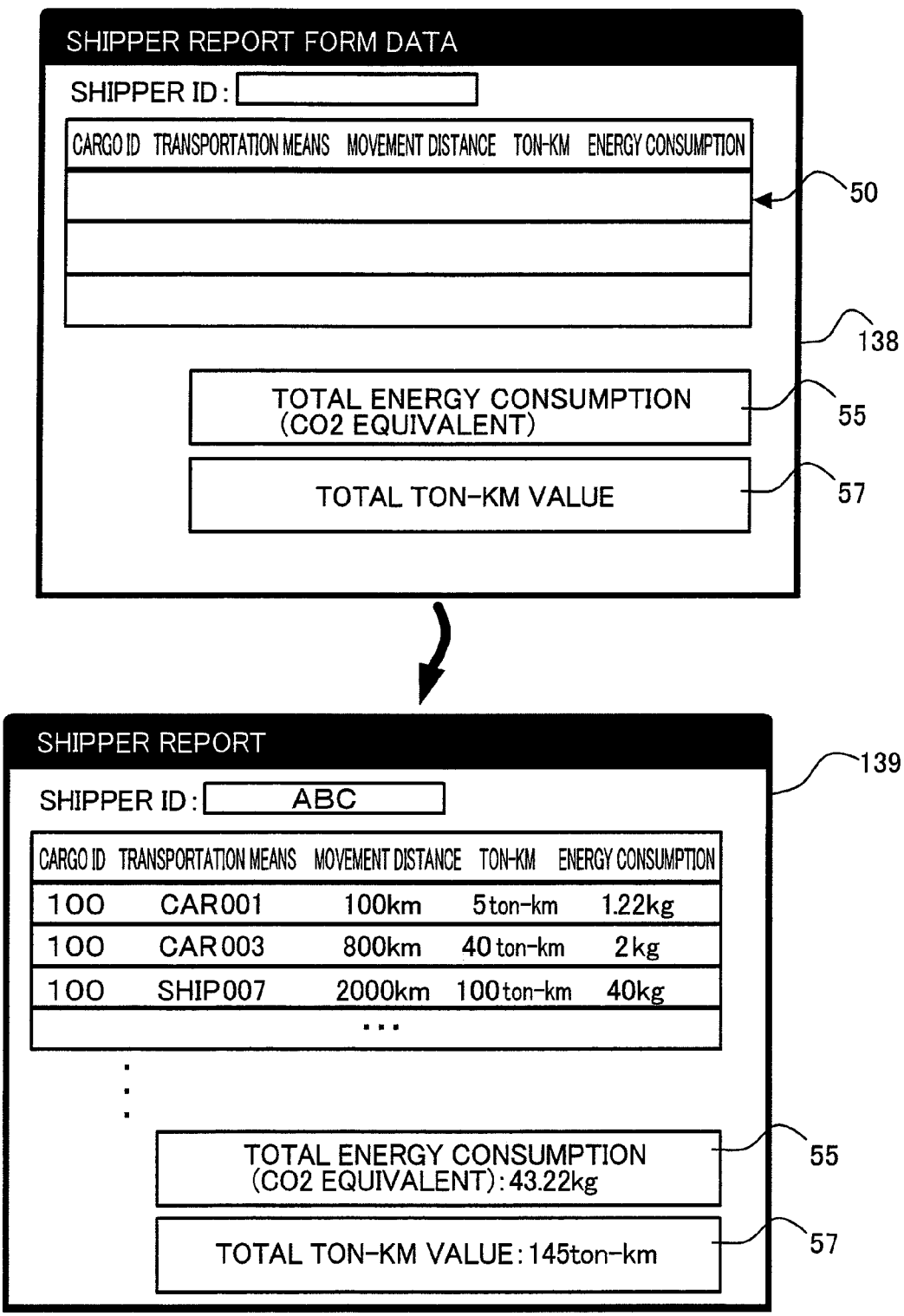
FIG. 7 depict examples of shipper report form data and a shipper report according to the embodiment.

The report submitting unit 115 reads the shipper report form data 138 preliminarily stored in the appropriate storage apparatus (e.g., the memory 103) (s110). It is assumed that the read shipper report form data 138 are document data disposed with corresponding item fields 50 (e.g., the fields correlated with flags for filling the fields with the information of the energy consumption and the movement distance record in the form data). As shown in FIG. 7, an example is a document data that shows movement distances of cargos in a list of each movement distance of all the transportation means that have relayed the cargos (transportation means A: 100 km, transportation means B: 800 km, etc.) to correlate the energy consumption required for the cargos in the transportation means with the list. In the example of FIG. 7, a total amount 55 of energy consumption required for the cargos is calculated and displayed by aggregating each energy consumption in the fields 50. A total distance of the movement of the cargos may be calculated and displayed by aggregating each movement distance in the fields 50. The report submitting unit 115 fills the corresponding fields of the shipper report form data 138 with the information of the energy consumption and the movement distance record to create the shipper report 139 (s111).

The generated shipper report data are output to the output interface 106 such as the display apparatus included in the system 100 or to the shipper terminal 300 that can perform data communication through the network 140 (s112). The shipper terminal 300, etc., receive and display the shipper report 139 on the own output interface to terminate the process (s113).

Figure 8:
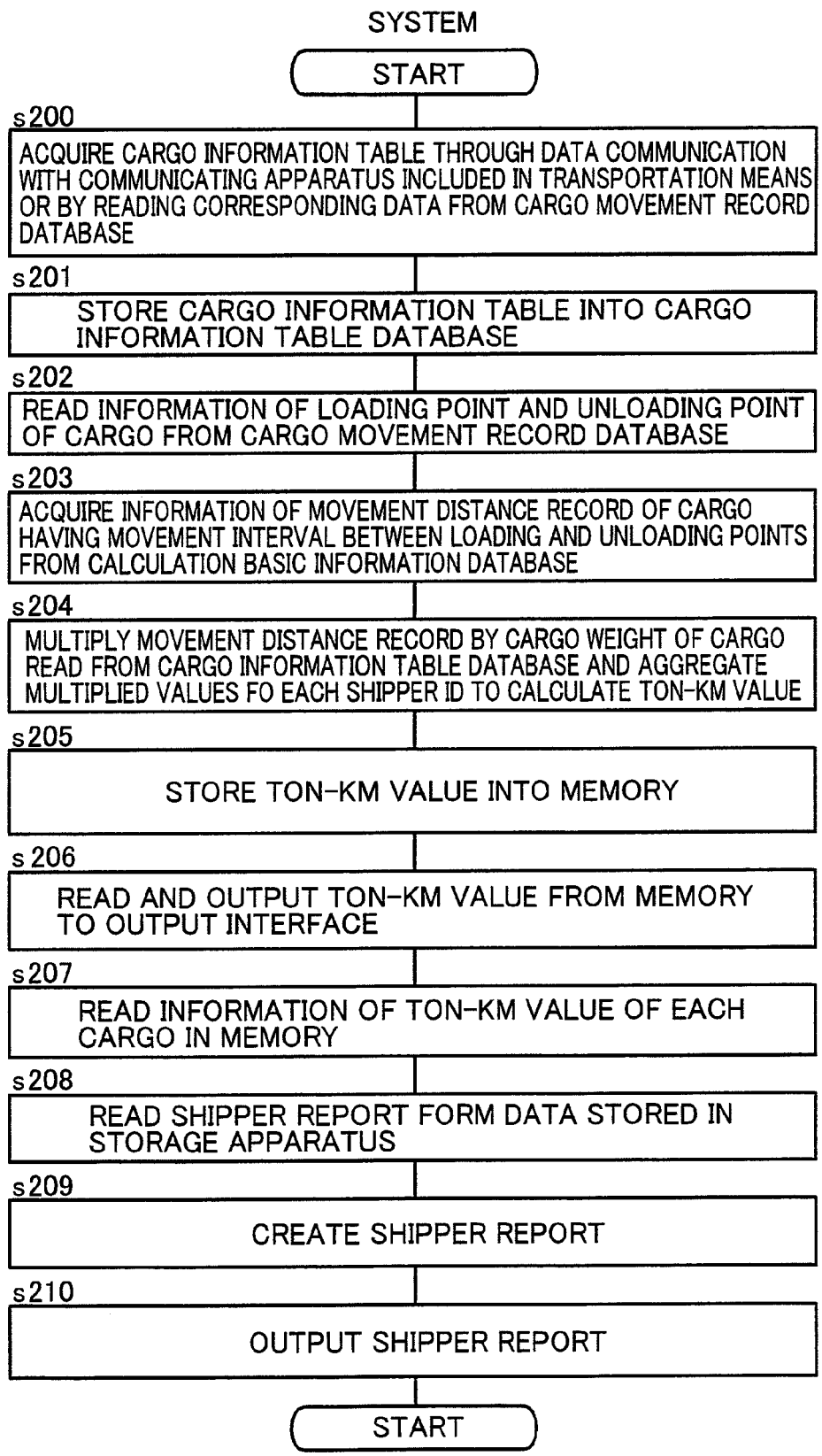
FIG. 8 depicts a process flow example 2 corresponding to the transport information managing method according to the embodiment.

With regard to calculation and output processes of a ton-km value related to transportation of each cargo, an embodiment is as follows. FIG. 8 depicts a process flow example 2 corresponding to the transport information managing method according to the embodiment. The cargo information table acquiring unit 116 of the system 100 acquires the cargo information table 150 including information of at least a shipper ID, a cargo ID and a cargo weight for each cargo through data communication with the communicating apparatus 200 included in the transportation means or by reading the corresponding data from the cargo movement record database 126 (s200). The acquired cargo information table 150 of each cargo is stored into the cargo information table database 128 (s201).

The ton-km value calculating unit 117 of the system 100 reads the information of the loading point and unloading point of the cargo from the cargo movement record database 126 (s202). The ton-km value calculating unit 117 acquires from the calculation basic information database 125 the information of the movement distance record of the cargo having a movement interval between the read loading and unloading points (s203). The ton-km value calculating unit 117 multiplies the movement distance record by the cargo weight of the cargo read from the cargo information table database 128 to calculate the ton-km value for each cargo (s204). The calculated ton-km value for each cargo is stored in the memory 103 (s205). For example, with regard to the cargo ID "100", the ton-km value of the transportation means "CAR001" is 50 kg×100 km/1000=5 ton·km (see, FIG. 2, FIGS. 4A and 4B, etc.). A ton-km value for each shipper ID ("total ton-km value" of FIG. 7) can be calculated by retrieving data with the same shipper ID in the memory 103, i.e., data for the same shipper among the ton-km value data calculated for each cargo and by aggregating the retrieved ton-km values correlated with the same shipper ID. The ton-km value is stored in the memory 103.

The output processing unit 114 reads and outputs the ton-km value from the memory 103 to the output interface (s206).

Alternatively, the report submitting unit 115 of the system 100 reads and uses the information of the ton-km value of each shipper from the memory 103 when creating a report for a shipper. The report submitting unit 115 reads the information of the ton-km value of each cargo and each shipper in the memory 103 (s207).

The report submitting unit 115 reads the shipper report form data 138 preliminarily stored in the appropriate storage apparatus (e.g., the memory 103) (s208). It is assumed that the read shipper report form data 138 are document data disposed with corresponding item fields 50 (e.g., the fields correlated with flags for filling the fields with the information of the ton-km value in addition to the above information of the energy consumption and the movement distance record in the form data). As shown in FIG. 7, an example is a document data that shows movement distances of cargos in a list of each movement distance of all the transportation means that have relayed the cargos (transportation means A: 100 km, transportation means B: 800 km, etc.) to correlate the energy consumption required for the cargos in the transportation means and the ton-km values with the list. In the examples of FIG. 7, the ton-km value of each cargo is obtained by aggregating ton-km values of the same cargo (5 ton·km, 40 ton·km, and 100 ton·km in the examples of FIG. 7) calculated for each transportation means and is further aggregated for each shipper to calculate a total ton-km value 57, which is shown in the shipper report 139. The report submitting unit 115 fills the corresponding fields of the shipper report form data 138 with the information of each ton-km value in addition to the above energy consumption and movement distance record to create the shipper report 139 (s209).

The generated shipper report data are output to the output interface 106 such as the display apparatus included in the system 100 or to the shipper terminal 300 that can perform data communication through the network 140 (s210), and the flow is terminated.

According to the embodiment, the calculation and output process can efficiently and certainly be performed for the transport energy usage amount of each cargo and shipper.

Although the embodiment of the present invention has specifically been described based on the embodiment, this is not a limitation and can variously be changed without departing from the gist thereof.

What is claimed is:

1. A transport information managing system configured by one or more computer machines, the transport information managing system performing information management associated with cargo transportation, comprising: a movement record acquiring computer machine configured to acquire an ID of a transportation means transporting a cargo, information of place and time of loading and unloading of the cargo to and from the transportation means, the information including at least one of a loading point, an unloading point, a loading time, and an unloading time, and a load amount of the cargo, along with information of a cargo ID of the cargo, as a cargo movement record, through data communication with a communication apparatus included in the transportation means, and configured to store the acquired cargo movement record into computer memory as a cargo movement record database for each cargo ID; a load amount identifying computer machine configured to read the information of the cargo ID, load amount, transportation means ID, loading time, and unloading time of each cargo included in each cargo movement record from the cargo movement record database to identify cargos having overlapping periods between the loading time and unloading time and transported by the same transportation means among the cargos, the load amount identifying computer machine configured to aggregate the load amounts of the identified cargos to calculate a load amount loaded at each clock time by each transportation means as a past load amount, the load amount identifying computer machine configured to store the information of the transportation means, time, and past load amount into the computer memory as a load record database as a load record; an average load amount calculating computer machine configured to read the information of the transportation means, loading time, and unloading time of cargos included in the cargo movement record from the cargo movement record database, the average load amount calculating computer machine configured to read the past load amount of the transportation means in a loading period between the read loading time and unloading time from the load record database, the average load amount calculating computer machine configured to calculate an average value of the past load amount in the loading period as an average load amount, which is stored into the computer memory; an energy consumption calculating computer machine configured to divide the load amount of the cargo in the cargo movement record database by the average load amount in the computer memory, the energy consumption calculating computer machine configured to multiply the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the computer memory; and an output processing unit that reads and outputs the energy consumption of each cargo from the computer memory to an output interface.

2. The transport information managing system of claim 1, comprising a report submitting computer machine configured to fill corresponding fields of shipper report form data read from an appropriate storage apparatus with the information of the energy consumption of each cargo from the computer memory and the information of the movement distance record of the transportation means in the time zone read from the calculation basic information database, to create and output a shipper report to the output interface.

3. The transport information managing system of claim 1, comprising: a cargo information table acquiring computer machine configured to acquire a cargo information table including information of at least a shipper ID, a cargo ID and a cargo weight for each cargo through data communication with a communicating apparatus included in the transportation means or by reading the corresponding data from the cargo movement record database to store the acquired cargo information table of each cargo into a cargo information table database, and a ton-km value calculating computer machine configured to read the information of the loading point and unloading point of the cargo from the cargo movement record database, the ton-km value calculating computer machine configured to acquire from the calculation basic information database the information of the movement distance record of the cargo having a movement interval between the read loading and unloading points, the ton-km value calculating computer machine configured to multiply the movement distance record by the cargo weight of the cargo read from the cargo information table database, the ton-km value calculating computer machine configured to aggregate the multiplied values for each shipper ID to calculate and store a ton-km value into a computer memory, wherein the output processing unit outputs the ton-km value read from the computer memory to the output interface.

4. The transport information managing system of claim 3, comprising a report submitting computer machine configured to fill the corresponding fields of the shipper report form data read from the appropriate storage apparatus with the information of the ton-km value of each shipper ID in the computer memory, to create and output a shipper report to the output interface.

5. A transport information managing method carried out by one or more computer machine, the transport information managing method performing information management associated with cargo transportation comprising: acquiring, via a movement record acquiring computer machine, an ID of a transportation means transporting a cargo, information of place and time of loading and unloading of the cargo to and from the transportation means, the information including at least one of a loading point, an unloading point, a loading time, and an unloading time, and a load amount of the cargo, along with information of a cargo ID of the cargo, as a cargo movement record through data communication with a communication apparatus included in the transportation means to store the acquired cargo movement record into computer memory as a cargo movement record database for each cargo ID; reading, via a load amount identifying computer machine, the information of the cargo ID, load amount, transportation means ID, loading time, and unloading time of each cargo included in each cargo movement record from the cargo movement record database to identify cargos having the overlapping periods between the loading time and unloading time and transported by the same transportation means among the cargos, aggregating, via the load amount identifying computer machine, the load amounts of the identified cargos to calculate a load amount loaded at each clock time by each transportation means as a past load amount, and storing the information of the transportation means, time, and past load amount into the computer memory as a load record database as a load record; reading, via an average load amount calculating computer machine, the information of the transportation means, loading time, and unloading time of cargos included in the cargo movement record from the cargo movement record database, reading the past load amount of the transportation means in a loading period between the read loading time and unloading time from the load record database, and calculating, via the average load amount calculating computer machine, an average value of the past load amount in the loading period as an average load amount, which is stored into the computer memory; dividing, via an energy consumption calculating computer machine, the load amount of the cargo in the cargo movement record database by the average load amount in the computer memory, multiplying, via the energy consumption calculating computer machine, the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the computer memory; and reading and outputting the energy consumption of each cargo from the computer memory to an output interface.

6. A computer-readable medium having computer-readable instructions embedded therein which, when executed by a computer, causing the computer to implement a transport information managing method performing information management associated with cargo transportation, comprising: acquiring ID of a transportation means transporting a cargo, information of place and time of loading and unloading of the cargo to and from the transportation means, the information including at least one of a loading point, an unloading point, a loading time, and an unloading time, and a load amount of the cargo, along with information of a cargo ID of the cargo, as a cargo movement record through data communication with a communication apparatus included in the transportation means to store the acquired cargo movement record into a cargo movement record database for each cargo ID; reading the information of the cargo ID, load amount, transportation means ID, loading time, and unloading time of each cargo included in each cargo movement record from the cargo movement record database to identify cargos having the overlapping periods between the loading time and unloading time and transported by the same transportation means among the cargos, aggregating the load amounts of the identified cargos to calculate a load amount loaded at each clock time by each transportation means as a past load amount, and storing the information of the transportation means, time, and past load amount into a load record database as a load record; reading the information of the transportation means, loading time, and unloading time of cargos included in the cargo movement record from the cargo movement record database, reading the past load amount of the transportation means in a loading period between the read loading time and unloading time from the load record database, and calculating an average value of the past load amount in the loading period as an average load amount, which is stored into the computer memory; dividing the load amount of the cargo in the cargo movement record database by the average load amount in the computer memory, multiplying the divided value by the movement distance record, fuel consumption, and fuel unit requirement of the transportation means in the time zone read from a calculation basic information database storing the fuel-consumption information of the transportation means of the cargo, the unit requirement information of the fuel used by the transportation means, and information of the movement distance record of the transportation means to calculate and store the energy consumption of each cargo into the computer memory; and reading and outputting the energy consumption of each cargo from the computer memory to an output interface.

* * * * *